Feb. 1, 1927.

F. GELSTHARP 1,615,834

APPARATUS FOR MAKING PLATE GLASS

Filed May 18, 1925     3 Sheets-Sheet 1

INVENTOR
F. Gelstharp
by James E. Bradley
Atty

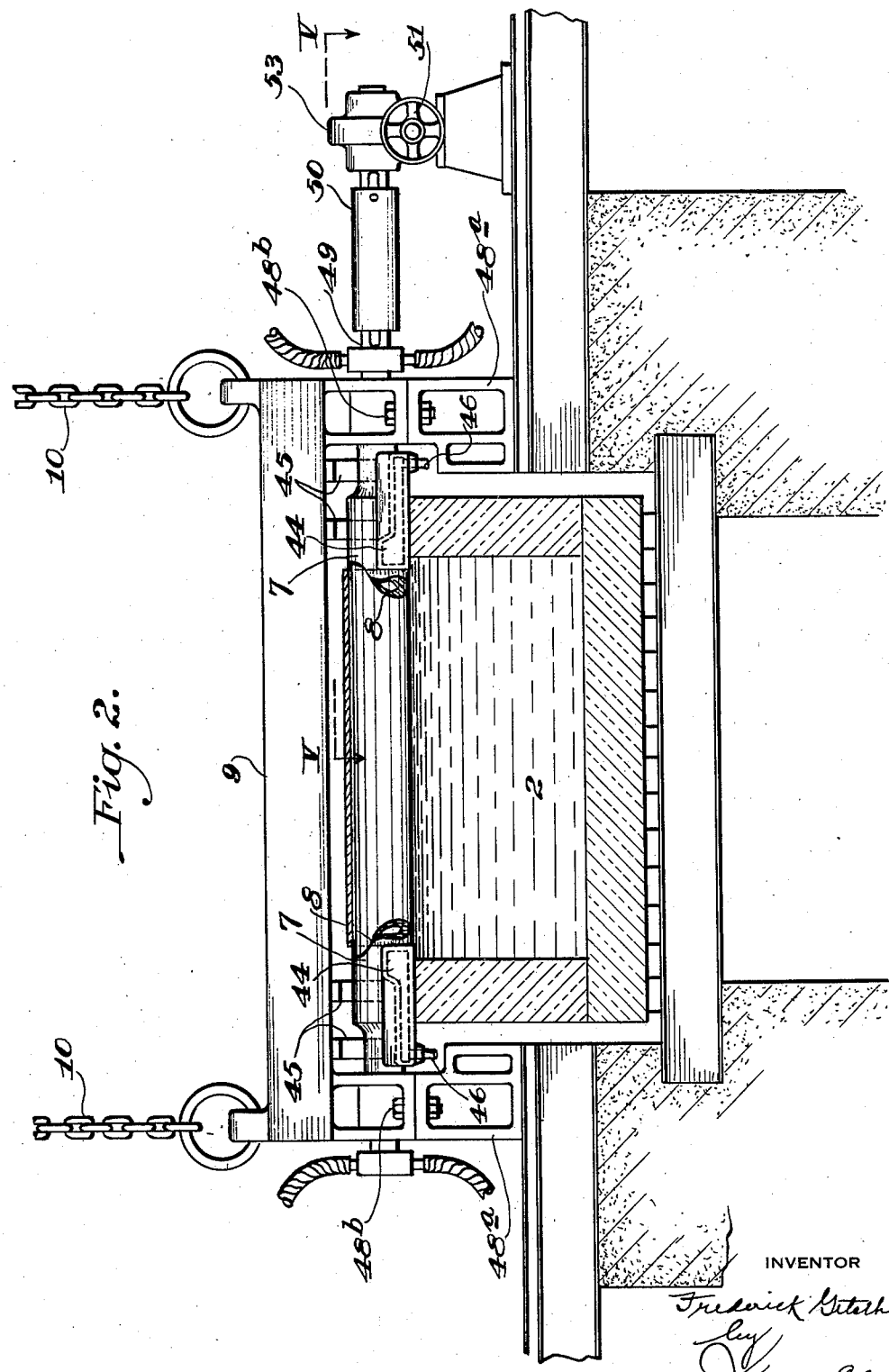

Feb. 1, 1927.
F. GELSTHARP
1,615,834
APPARATUS FOR MAKING PLATE GLASS
Filed May 18, 1925    3 Sheets-Sheet 3
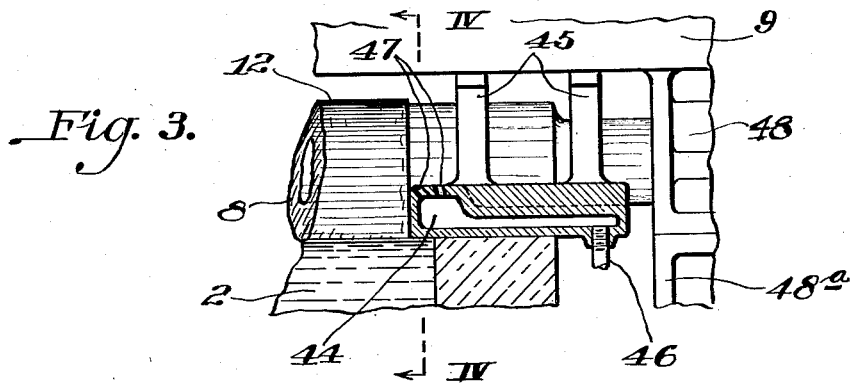
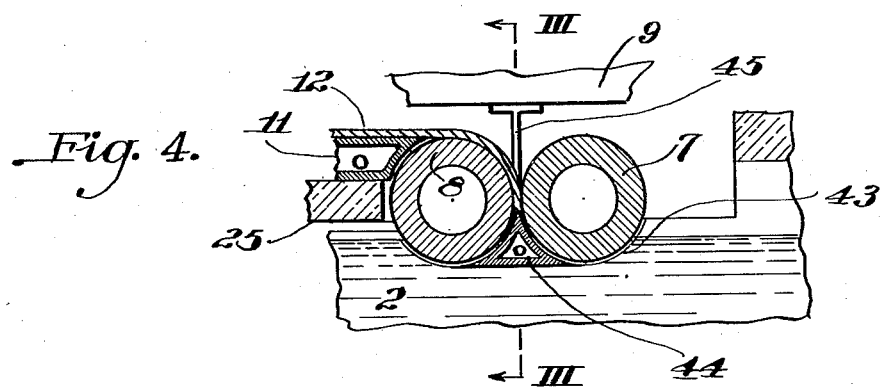
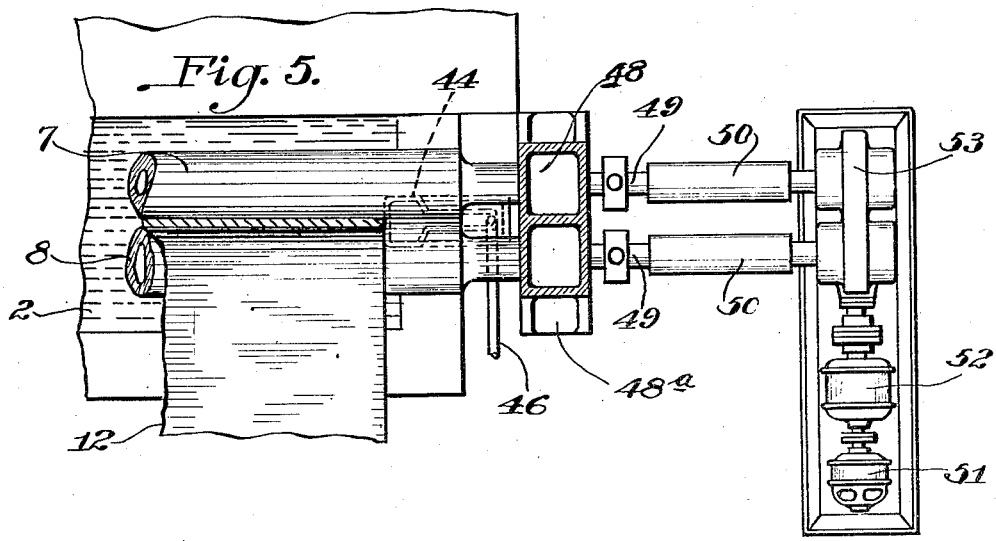
INVENTOR
Frederick Gelstharp
by
James C. Bradley Patented Feb. 1, 1927.

1,615,834

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING PLATE GLASS.

REISSUE

Application filed May 18, 1925. Serial No. 30,950.

Figure 1:
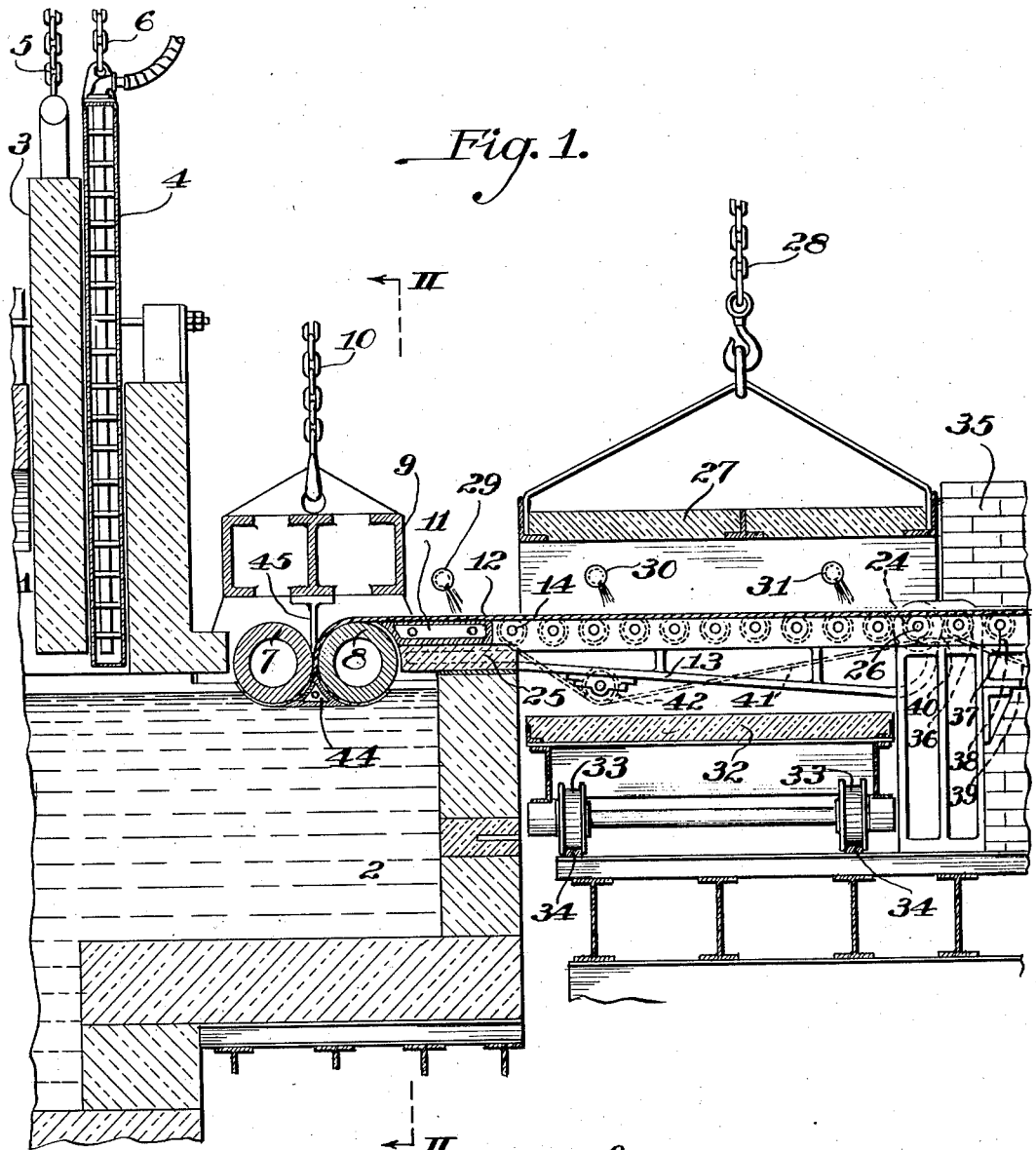
Figure 6:
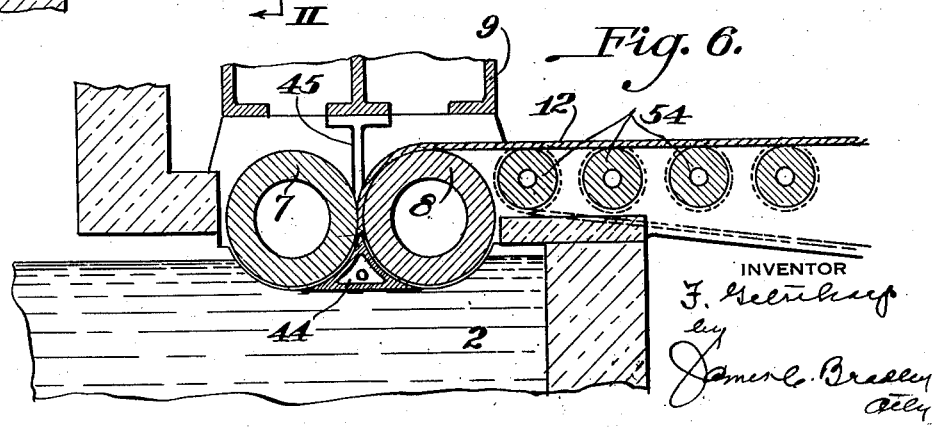

The invention relates to apparatus for producing a continuous sheet or ribbon continuously from a body of molten glass. It has for its primary object the provision of improved means for accomplising the function as above set forth and for producing glass of superior quality, which is perfectly flat and relatively smooth so that it requires a minimum amount of grinding preliminary to polishing in the production of finished plate glass. Certain embodiments of the invention are illustrated in the accompanying drawings wherein:

Figure 1 is a vertical section through the apparatus. Fig. 2 is a transverse section on the line II—II of Fig. 1. Figs. 3 and 4 are enlarged detailed sections, Fig. 3 being taken on the line III—III of Fig. 4 and Fig. 4 being taken on the line IV—IV of Fig. 3. Fig. 5 is a section on the line V—V of Fig. 2. And Fig. 6 is a vertical section through a modification of the Fig. 1 construction.

Referring to the drawings, 1 is the end of a melting tank, preferably of the well-known regenerator type having at its end the forehearth or kiln 2 with a pair of cut off gates 3 and 4, arranged as indicated in Fig. 1. These gates are supported from above by means of the chains 5 and 6 carried by suitable overhead lifting means, not shown, the gate 3 being of refractory material, such as clay, and the gate 4 being of metal provided with means whereby it may be cooled by a circulation of water.

The upper side of the forehearth 2 is open and in this open space is mounted a pair of forming or sizing rolls 7 and 8, such rolls being journaled at their ends in the bridge 9, such bridge being movable into and out of position by means of an overhead crane, not shown, to which the bridge is connected by means of the chains 10.

On the outer side of the roll 8 is a table or platen 11, preferably water cooled by means of a circulation therethrough. The glass sheet 12 passes over the table 11 and onto the apron 13, such apron being provided with a series of water cooled driven rolls 14 to 24. The apron rests at this left hand end upon the clay block 25 and at its right hand end is pivoted for swinging movement around the axle 26 of the roll 24, so that when desired, the apron may be swung up to a vertical position from the horizontal position shown. Mounted above the apron is a portable cover 27 supported from above by means of the chain 28 preferably carried upon a suitable crane whereby the cover may be moved laterally after it is lifted from the position shown. A plurality of burner pipes 29, 30 and 31 are employed for maintaining the temperature of the glass in its passage to the leer. Beneath the apron is a portable bottom member 32 supported upon the truck 33 mounted on the track 34. The member 32 assists in maintaining temperature conditions constant in the space surrounding the glass thereabove. The truck permits the member 32 to be removed to one side when the apron is removed in order to give more ready access to the front end of the furnace for replacements or repairs.

From the apron, the glass passes into the end of the leer 35, which is of the roller type employing the series of rolls 36, 37, 38, etc. The leer rolls are driven by means of a chain 39 passing around suitable sprockets on the ends of the roll shafts. The end roll 24 of the series of apron rolls is driven from the end leer roll 36 by means of a short chain 40, passing around suitable sprockets on the ends of the two rolls. The other apron rolls are driven by means of the chain 41 passing around a sprocket on the end of the roll 26 and over the tops of other sprockets carried by the ends of the apron rolls. An idler roll 42 is provided as a take-up for maintaining the chain 41 in tension.

The ends of the rolls 7 and 8 are set down into the side walls of the forehearth 2 as indicated at 43 in Fig. 4 and the triangular space in the wall between the rolls is preferably closed by means of the hollow metal member 44, commonly referred to as a "gun". This member is supported from the bridge by means of the webs or brackets 45 and is heated from a burner pipe 46 leading in at one end, the gases of combustion being allowed to discharge through perforations 47 at the other end. The heating of the member 44 tends to give the edge of the sheet which is formed a smoother finish and prevent fire cracks, which would tend to cause breakage. The ends of the rolls are preferably journaled in the bearings 48 carried by the bridge and water cooled by means of water circulated through the pipes 49.

The ends of the rolls are provided with the tumbler shafts 50 driven from the motor 51 (Fig. 5) through the intermediary of reducing gearing in the casing 52 and in the casing 53, the gearing in the casing 53 comprising worms driving suitable worm wheels on the shafts to which the tumbler shafts 50 are connected. The ends of the bridge are supported by the standards 48ᵃ (Fig. 2) to which such ends are secured by means of the bolts 48ᵇ.

In operation, the rolls 7 and 8 are rotated continuously, drawing up from the body of molten glass the sheet 12 which passes over the table 11 and the apron 13 to the leer. The contact of the glass with the rolls 7 and 8 and with the table 11 causes it to set to such an extent that it will not sag to any substantial degree when it passes over the rollers of the apron 13 and from this point on, any unevenness in the glass is flattened out as the sheet progresses over the rollers and through the leer. The glass is annealed in the leer and cut off at the far end thereof, after which it is ground and polished in the usual way on circular tables or in a straight away surfacing operation. The rolls 7 and 8 size the sheet to substantially its final thickness, the surface formed being relatively smooth as compared with plate glass cast in the usual way on tables, but requires grinding and polishing due to the marring of the surface by the rolls.

Fig. 6 illustrates a modification, which differs from that of Fig. 1 only in that the sheet 12 as formed between the sizing rolls 7 and 8 passes directly onto the water cooled rolls 54 of the apron, instead of passing first onto a table or platen, such as the table 11 in Fig. 1. This arrangement may be used if the glass sheet as it is formed by the rolls 7 and 8 is sufficiently chilled so that it will not sag to any substantial extent in passing to the end roll of the apron and over the succeeding rolls of the apron.

What I claim is:

1. In combination, a glass tank containing a body of molten glass, and having a slot in its upper wall, a pair of horizontal driven and cooled sizing rolls seated in said slot, and having the lower portions of their peripheries immersed in said body of glass, and a glass receiving bed extending laterally from the side of one of said rolls for carrying away the glass which is formed.

2. In combination, a glass tank containing a body of molten glass, and having a slot in its upper wall, a pair of horizontal driven and cooled sizing rolls seated in said slot and having the lower portions of their peripheries immersed in said body of glass, a bridge in which the ends of the rolls are journaled, means for supporting the bridge for vertical movement, and a glass receiving bed extending laterally from the side of one of said rolls for carrying away the glass which is formed.

3. In combination, a glass tank containing a body of molten glass, and having a slot in its upper wall, a pair of horizontal driven and cooled sizing rolls seated in said slot, and constituting a closure therefor, and having the lower portions of their peripheries immersed in said body of glass, and a glass receiving bed extending laterally from the side of one of said rolls for carrying away the glass which is formed.

4. In combination, a glass tank containing a body of molten glass, and having a slot in its upper wall, a pair of horizontal driven and cooled sizing rolls seated in said slot, and having the lower portions of their peripheries immersed in said body of glass, a bridge in which the ends of the rolls are journaled, triangular closure means for the spaces between the rolls at the ends thereof carried by the bridge, means for supporting the bridge for vertical movement, and a glass receiving bed extending laterally from the side of one of said rolls for carrying away the glass which is formed.

In testimony whereof, I have hereunto subscribed my name this 11th day of May, 1925.

FREDERICK GELSTHARP.